(12) United States Patent
Ma

(10) Patent No.: US 7,752,370 B2
(45) Date of Patent: Jul. 6, 2010

(54) SPLITTING ONE HARDWARE INTERRUPT TO MULTIPLE HANDLERS

(75) Inventor: Xiuling Ma, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 11/734,323

(22) Filed: Apr. 12, 2007

(65) Prior Publication Data

US 2008/0256280 A1 Oct. 16, 2008

(51) Int. Cl.
G06F 13/24 (2006.01)

(52) U.S. Cl. .................. 710/263; 710/268; 710/269

(58) Field of Classification Search .............. 710/263, 710/266, 268, 269
See application file for complete search history.

(56) References Cited

U.S. PATENT DOCUMENTS

| | | | | |
|---|---|---|---|---|
| 4,271,468 A | * | 6/1981 | Christensen et al. ........... 710/39 |
| 5,305,454 A | * | 4/1994 | Record et al. ................ 719/318 |
| 5,515,538 A | * | 5/1996 | Kleiman ..................... 710/260 |
| 5,701,495 A | * | 12/1997 | Arndt et al. ................ 710/263 |
| 5,892,957 A | * | 4/1999 | Normoyle et al. ........... 710/263 |
| 6,415,332 B1 | | 7/2002 | Tuel, Jr. |
| 6,715,005 B1 | | 3/2004 | Rodriguez et al. |
| 6,775,728 B2 | * | 8/2004 | Zimmer et al. ............... 710/260 |
| 6,799,317 B1 | | 9/2004 | Heywood et al. |
| 6,859,462 B1 | | 2/2005 | Mahoney et al. |
| 6,968,411 B2 | | 11/2005 | Gaur et al. |
| 7,016,998 B2 | | 3/2006 | Mukherjee |
| 2008/0104296 A1 | * | 5/2008 | Blackmore et al. .......... 710/267 |

* cited by examiner

Primary Examiner—Khanh Dang
(74) Attorney, Agent, or Firm—Lieberman & Brandsdorfer, LLC

(57) ABSTRACT

A method and apparatus are provided for reducing latency associated with processing events of a hardware interrupt. Send and receive events share the same hardware interrupt. A receive handler and a separate send handler are provided to simultaneously process completion of a send event and a receive event. In addition, separate queues are provided to communicate receipt of an event to the respective interrupt handler.

20 Claims, 7 Drawing Sheets

SPLITTING ONE HARDWARE INTERRUPT TO MULTIPLE HANDLERS

BACKGROUND OF THE INVENTION

1. Technical Field

This invention relates to an interrupt handler for a hardware interrupt. More specifically, the invention relates to separating management of tasks in the interrupt handler based upon categorization of the task.

2. Description of the Prior Art

An interrupt is a signal informing a CPU that an event has occurred. The interrupt can be in the form of a software interrupt or a hardware interrupt. In one embodiment, the interrupt is a digital signal to a CPU that indicates some event has happened. When the CPU receives an interrupt, it takes a specified action. For example, an interrupt can cause the CPU to suspend an interruptible task to temporarily service the interrupt. Before the CPU can respond to an interrupt, the processor must wait for an interruptible state in its processing. For example, if the processor is writing to memory, it must wait until the write is completed before processing the interrupt. Once the informing CPU detects the interrupt, it must save all of the information it will need to resume normal processing of the interrupted task once the interrupt is over. An interrupt handler is a callback subroutine in an operating system or device driver whose execution is triggered by the receipt of an interrupt. After the event that caused the interrupt is complete, an interrupt service routine restarts the interruptible task from where it had previously been suspended.

FIG. 1 is a flow chart (100) of a prior art process for generating an interrupt and processing the associated event. An event is received by a processor that generates a hardware interrupt (102). The event may be in the form of a send event or a receive event. In one embodiment, the event may include a bit which identifies whether the originating event is a send event or a receive event. Upon receipt of the event a hardware interrupt is generated (104), and the received event is placed in a mixed interrupt event queue (106). Both send and receive events are placed in a joint mixed interrupt event queue and are processed in the order in which they are received.

Placement of an event in the mixed interrupt event queue includes the need for processing of the event. As events are processed, they are placed in a completion queue for an interrupt handler to complete processing of event data. Both completed send and receive events are placed in the completion queue in the order in which they are processed from the mixed interrupt event queue (108). Processing of send or receive data in the completion queue invokes an interrupt handler which utilizes a single thread to periodically poll the completion queue to determine if there are items present in the completion queue to be processed (110). In one embodiment, the thread that monitors the completion queue is inactive, i.e. sleeps, when the completion queue is empty and is woken up by placement of any new data in the completion queue. If it is determined that there is no data present in the completion queue, the interrupt waits a preset time interval (112) before it returns to step (110) to poll the completion queue or the thread goes to sleep and waits for any new data in the completion queue. However, if it is determined that there is an item present in the completion queue for processing, it must be determined whether the next data item present in the completion queue is associated with an originating send event (114). In one embodiment, the determination at step (114) may solicit whether the next data item in the queue is associated with a receive event. A positive determination at step (114) is an indication that the send has been completed and a send handler in the interrupt handler is invoked to process the send data (116). The send interrupt handler needs to find the buffer pointer of the send data (118), validate the data packet (120), and release the data packet (122). Alternatively, if it is determined at step (114) that the next data item is not associated with completion data from a send event, then by default the next data item in the completion queue is associated with completion data from a receive event (124) and the interrupt handler needs to process the data associated with the receive interrupt handler (126). The receive interrupt handler needs to find the buffer pointer for the data being received (128), allocate a new buffer for a new direct memory access (130), process the data packet (132), and pass the data packet to upper layer protocols (134). Accordingly, a single interrupt handler polls a single completion queue to process data from both send and receive events, and forwards the next item in the queue to the appropriate send or receive handler in the interrupt handler.

FIG. 2 is a block diagram (200) illustrating a prior art device queue in relation to an interrupt handler. As shown, there are two forms of an originating event that may generate a hardware interrupt, a send event (202) and a receive event (204). Either of the events may generate a hardware interrupt (206). Both send events and receive events are placed in the same interrupt event queue (208). As shown in the example, there are four events, $event_1$ (210), $event_2$ (212), $event_3$ (214), and $event_4$ (216) in the queue (208). In this example, $event_1$ (210) is a send event, $event_2$ (212) is a send event, $event_3$ (214) is a receive event, and $event_4$ (216) is a receive event. As noted above, as the events in the mixed interrupt event queue (208) are processed, they are placed in a completion queue (218) for completion of processing of associated event data. The completion queue (218) is a single queue for processing of event data, and includes completion requests for originating send and receive events. The interrupt event queue (208) is different from the completion queue (218), as the interrupt event queue processes events and the completion queue processes completion of event data. As shown in this example, the completion queue (218) has four events that require completion. The events are shown in the order of receipt. Completion $event_1$ (220) is completion of processing of data from $event_1$ (210), completion $event_2$ (222) is completion of processing of data from $event_2$ (212), completion $event_3$ (224) is completion of processing of data from $event_3$ (214), and completion $event_4$ (226) is completion of processing of data from $event_4$ (216). Accordingly, the prior art queues associated with processing events and data for completion of the events are both mixed queues that process receive and event data in a first in first out order.

Furthermore, as shown in FIG. 2, the interrupt handler (250) has a send handler (260), a receive handler (270), and a thread (280) to periodically poll the completion queue (218) for presence of a data to be processed by the interrupt handler. If the thread (280) detects presence of an item in the queue (218) associated with completion of a send event, then the item is forwarded to the send handler (260) for completion. Similarly, if the thread (280) detects presence of an item in the queue (218) associated with completion of a receive event, then the item is forwarded to the receive handler (270) for completion. Accordingly, a single thread (280) in the interrupt handler is responsible for monitoring the completion queue for items associated with both originating send and receive events.

As shown above, the prior art process for processing data associated with a hardware interrupt has a single queue for executing both send and receive events, and another single queue for completing processing of data associated with such events. In addition, the interrupt handler is limited to a single thread for polling the completion queue. This structure restricts the interrupt handler to initiate data processing from items in the completion queue one item at a time, whether the items are associated with completion of data processing from a receive event or a send event. Accordingly, there is a need to accelerate processing of data in the completion queue by separating processing of completion data based upon whether they are associated with an originating send event or a receive event.

SUMMARY OF THE INVENTION

This invention comprises a method and apparatus for improving operation of an interrupt handler by separating task items based upon their respective categorization.

In one aspect of the invention, a method is provided for processing data. An event is received from a processor that generates a hardware interrupt. An interrupt handler is invoked to complete processing of data associated with the event. The interrupt handler has a send handler to process data associated with completion of a send transaction and a receive handler to process data associated with completion of a receive transaction. The interrupt handler supports simultaneous and separate processing of send process data and receive process data.

In another aspect of the invention, a computer system is provided with a processor in communication with an operating system. An event manager in communication with the operating system is provided to receive an event from the processor and to generate a hardware interrupt in response to receipt of the event. An interrupt handler in communication with the event manager is provided to complete processing of data associated with the event. The interrupt handler has a send handler to process data associated with completion of a send transaction and a receive handler to process data associated with completion of a receive transaction. The interrupt handler supports simultaneous and separate processing of send process data and receive process data.

In yet another aspect of the invention, an article is provided with a tangible computer readable carrier including computer program instructions configured to cause a computer to process data. Instructions are provided to receive an event from a processor that generates a hardware interrupt. Instructions are also provided to invoke an interrupt handler to complete processing of data associated with the event. The interrupt handler has a send handler to process data associated with completion of a send transaction and a receive handler to process data associated with completion of a receive transaction. The interrupt handler supports simultaneous and separate processing of send process data and receive process data.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Two separate queues are provided for completion of data processing for tasks associated with an interrupt event. More specifically, the device queue includes a send completion queue for processing data associated with a send interrupt event, and a receive completion queue for processing data associated with a receive interrupt event. In addition, the interrupt handler is provided with a send handler to manage send data and a receive handler to manage receive data. Both the send handler and the receive handler have separate threads to manage the respective device queues. More specifically, the send handler has a thread to monitor items in the send completion queue and the receive handler has a separate thread to monitor items in the receive completion queue. Both of the threads pull items from the respective completion queues to process the associated data packet. Separation of the completion queues together with separate threads to manage each of the completion queues enables the interrupt handler to simultaneously process a send event and a receive event.

Technical Details

Figure 1:
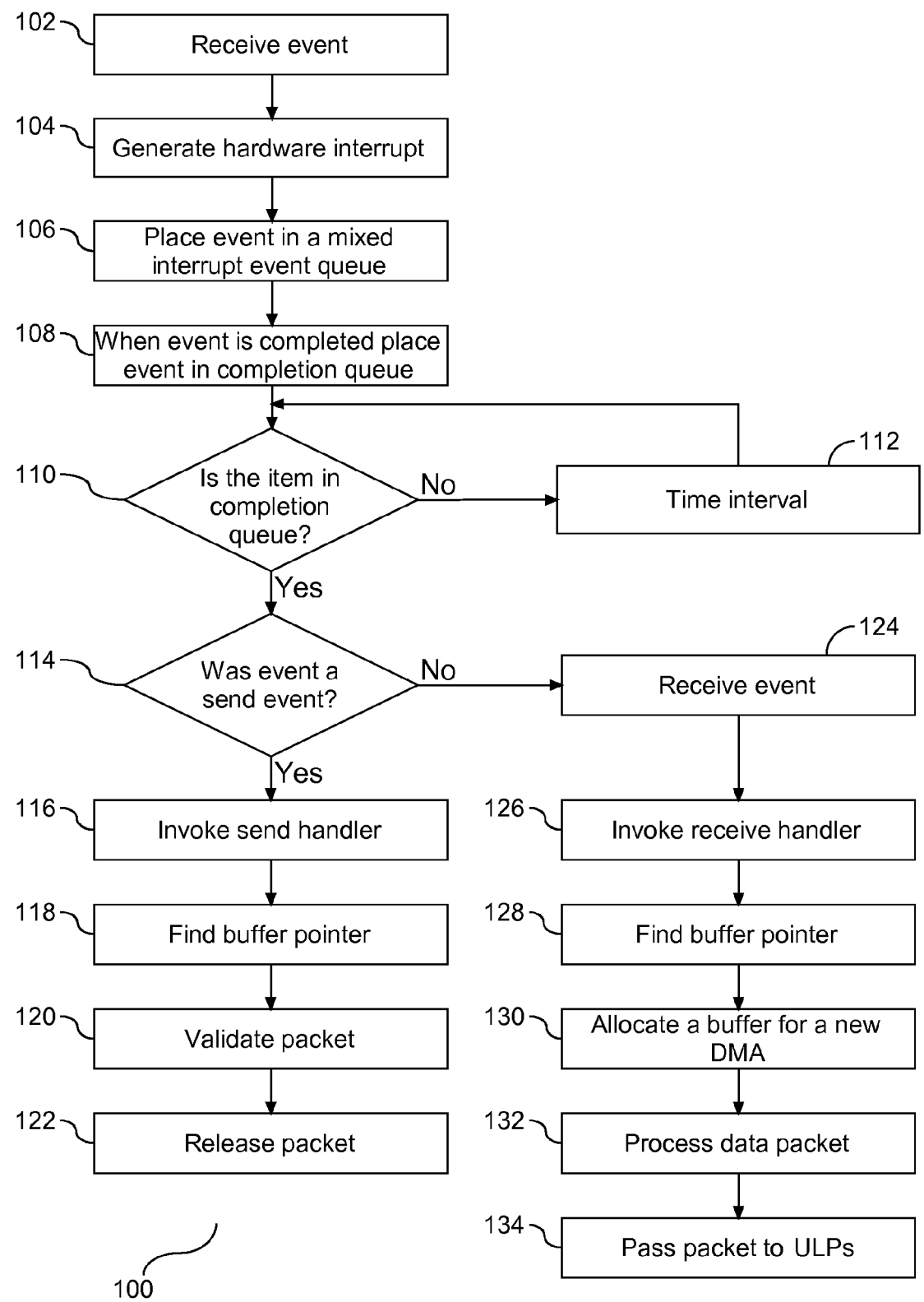
FIG. 1 is a flow chart illustrating a prior art process for processing of data by an interrupt handler.
Figure 2:
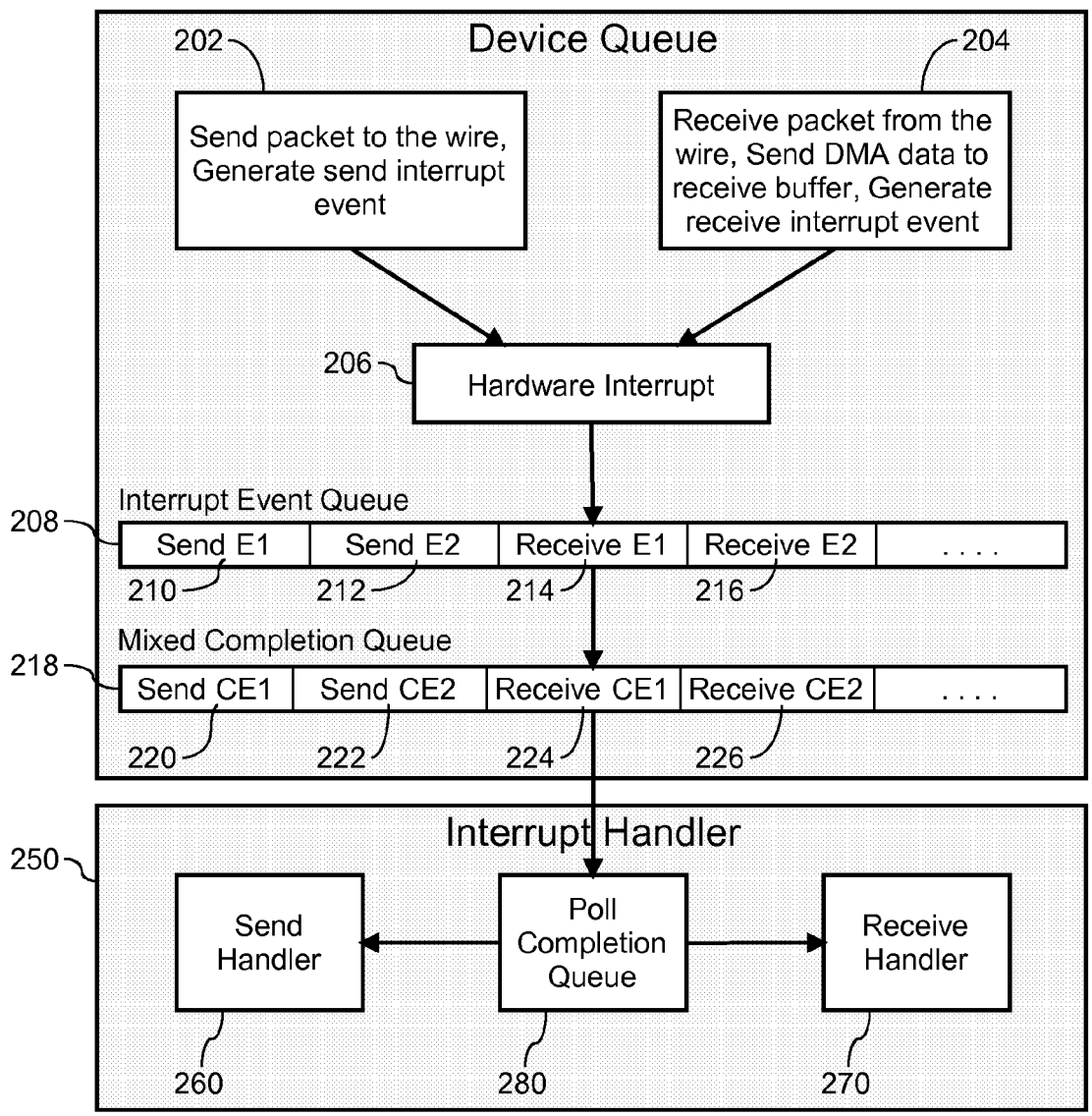
FIG. 2 is a block diagram of a prior art device queue in communication with an interrupt handler.
Figure 3:
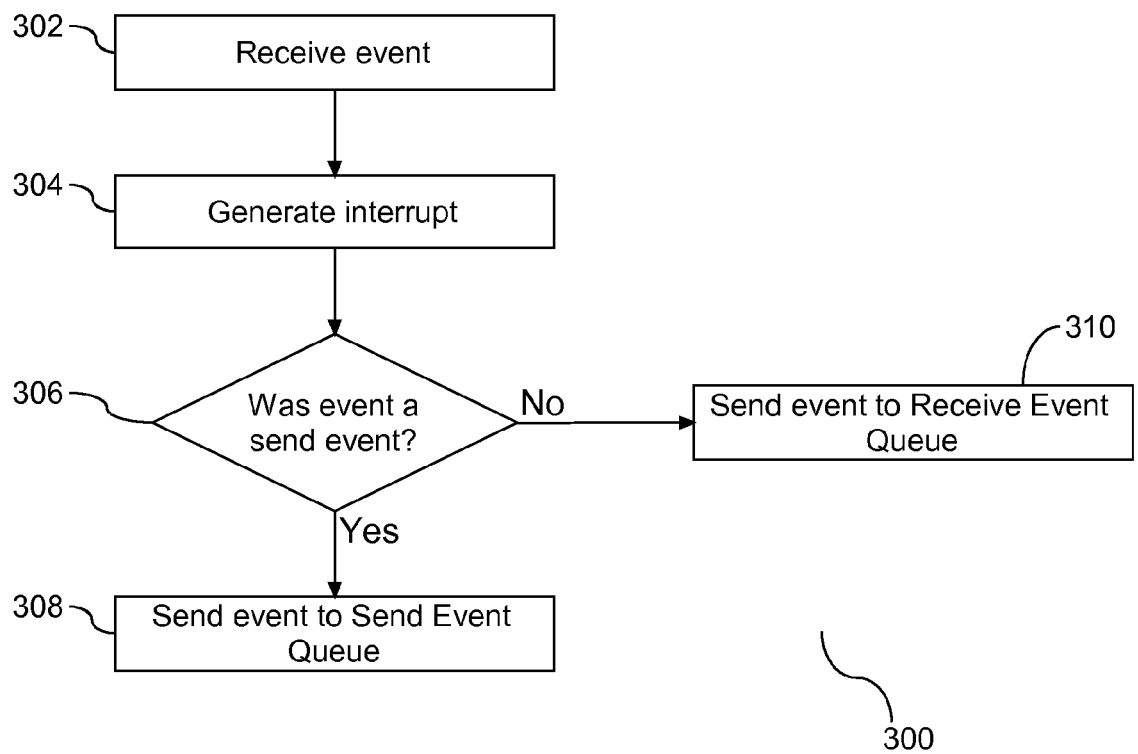
FIG. 3 is a flow chart illustrating a process for invoking an interrupt handler for a receive event.

FIG. 3 is a flow chart (300) illustrating a process for separating management of send and receive tasks that subject an operating system to a hardware interrupt. As illustrated above, an operating system only supports a single hardware interrupt. An event is received (302) that generates a hardware interrupt (304). The event may be in the form of a send event or a receive event. In one embodiment, a send event may include sending a packet of data which would generate an interrupt event, and a receive event may include receiving a packet of data which would generate an interrupt event. Furthermore, in one embodiment, the send or receive event that initiates the hardware interrupt may have a bit attached to the message that identifies the event as a send or receive event. Following receipt of either a send event or a receive event, a hardware interrupt is generated (304). There are two separate event queues, a send interrupt event queue and a receive interrupt event queue. Upon receive of the event; it is determined whether the event is a send event (306). For example, the event may have a bit attached to the message to indicate a send event, in which case the determination at step (306) is a test as to whether or not the event message has a bit attached. If the bit is not attached to the message, the event is a receive event. In one embodiment, the determination at step (306) may be whether the event is a receive event. Regardless of the format of the determination at step (306), the test is to determine whether or not the event is a send event or a receive event as the separate events are handled by separate queues and threads. If the event is a send event, the event is sent by a handler to a send event queue (308). Alternatively, if the event is not a send event it is by default a receive event, and the event is sent by a handler to a receive event queue (310). Accordingly, based upon the categorization of the event, it is sent to a corresponding queue to divide processing of events based upon their categorization.

Figure 4:
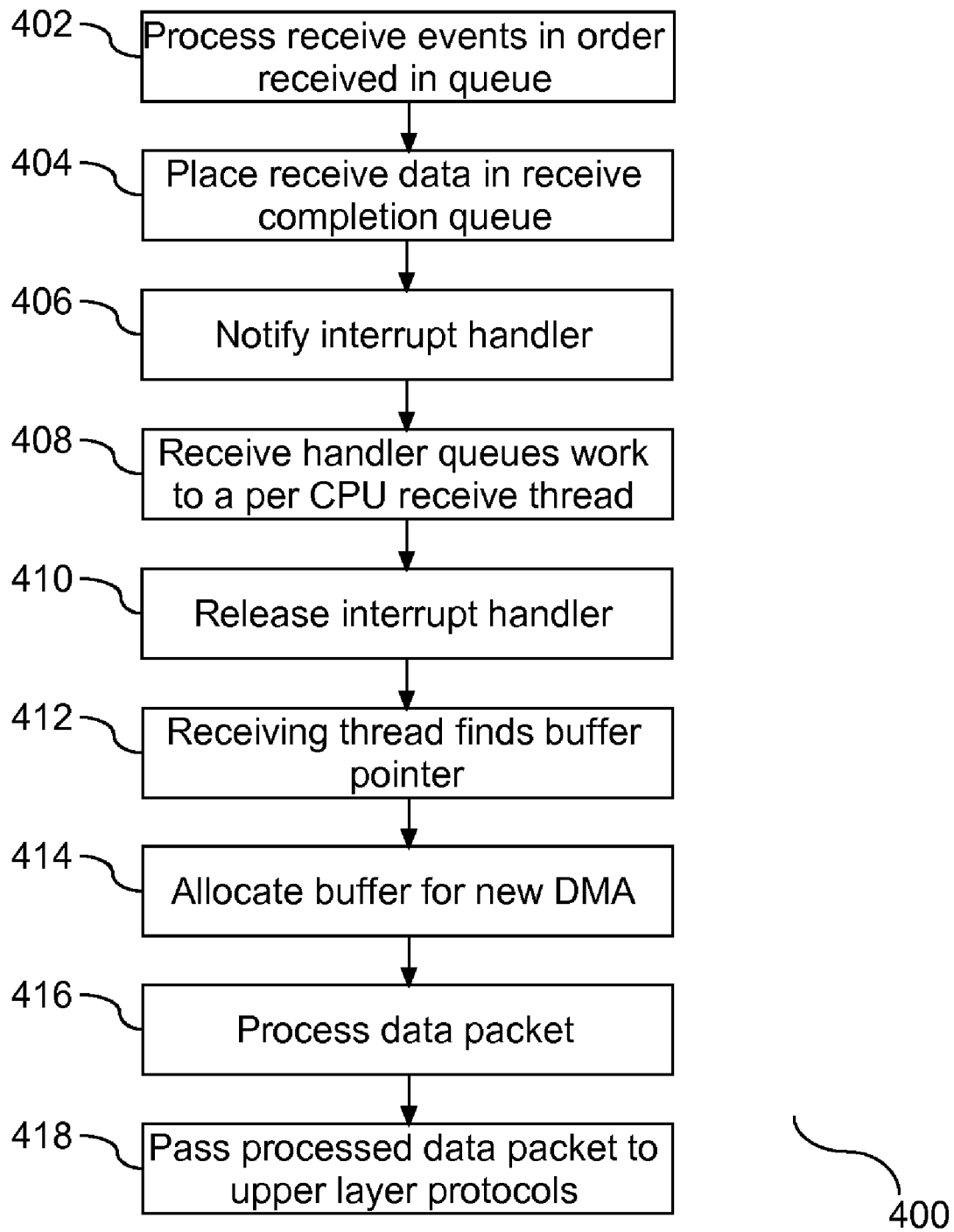
FIG. 4 is a flow chart illustrating a process for invoking an interrupt handler for a send event.

Events in the separate send and receive queues are processed in the order in which they are placed in the respective queue. The send queue and receive queue are unrelated. Events in the separate queues are processed separately by separate threads. FIG. 4 is a flow chart (400) illustrating a process for processing a receive event from the receive interrupt event queue. Events in the receive interrupt event queue are processed from the receive queue in the order in which they are received in the queue (402). Data associated with processing of the receive event is placed in a receive completion queue (404) for completion of processing by an interrupt handler. The interrupt handler has a send handler to process data associated with an originating send event, and a receive handler to process data associated with an originating receive event. The send handler operates independent of the receive handler. In the case of an item placed in a receive completion queue, a receive interrupt handler is notified of placement of the item in the receive completion queue. In one embodiment, all of the items in the completion queue are pulled from the associated receive completion queue by the receiving thread. However, the quantity of items pulls from the associated receive completion queue may be restricted based upon the quantity of items in the queue at any one time, and threshold restrictions, such as memory restrictions. If the quantity of items in the queue exceeds such a threshold, some of the items in the queue may remain in the queue until the prior items pulled from the queue have completed processing. In step 406, a receive handler is invoked by the receiving thread of the receive completion queue to process the receive completion when there are items in the queue that require processing, queue the work to a receiving thread operating on the same CPU on which the interrupt was received (408), and then release the interrupt handler (410). The receiving thread finds the buffer pointer for the data being received (412), allocates a buffer for a new direct memory access (414), processes the data packet (416), and passes the processed data packet to upper layer protocols (418). As demonstrated above, completion of a receive event includes placement in a receive completion queue and invokes a receive interrupt handler in the interrupt context. Completion of a receive interrupt handler includes queuing the data process work to a receiver thread.

Figure 5:
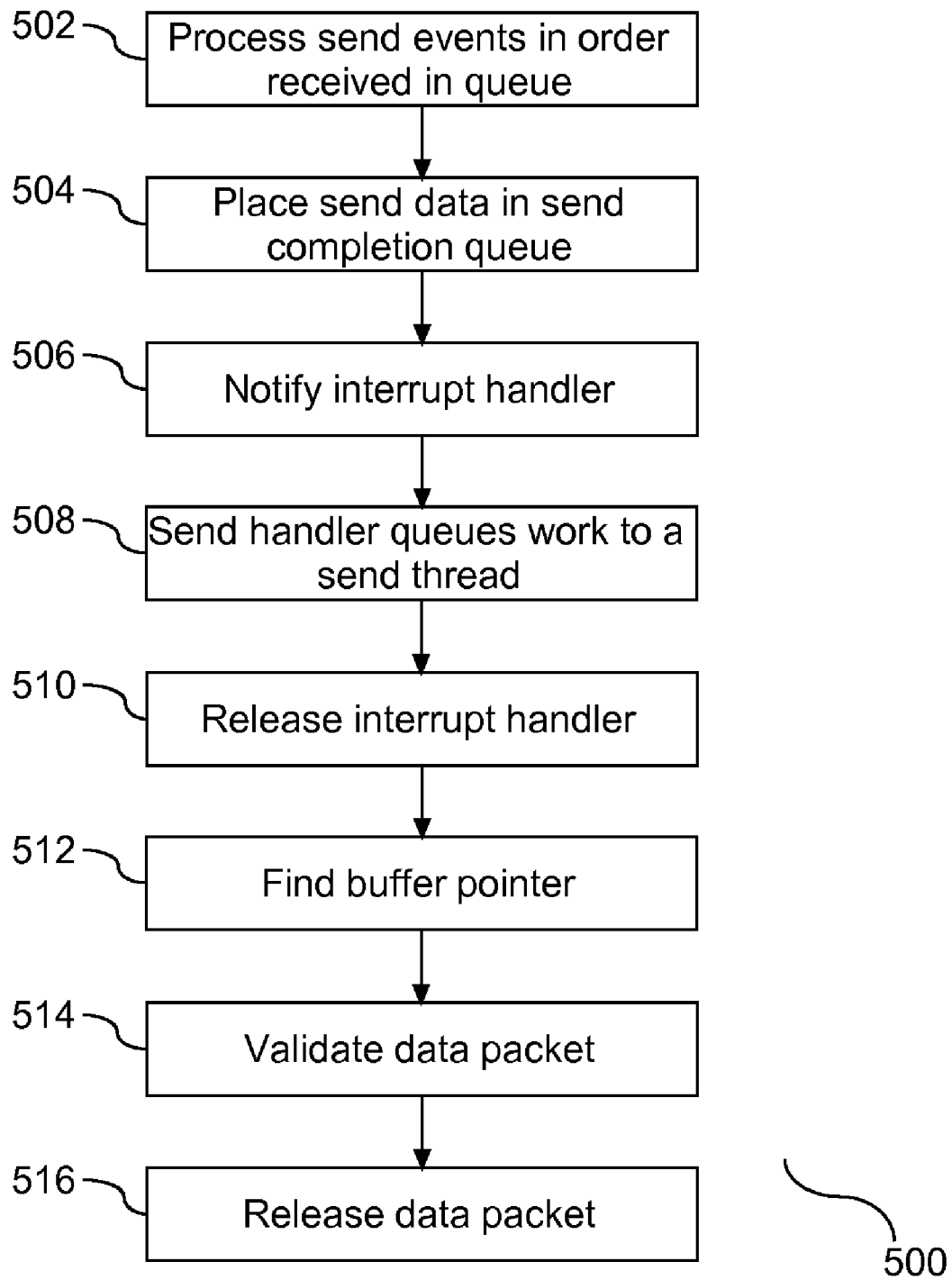
FIG. 5 is a flow chart illustrating a process for processing data by a receive handler.

At the same time as the receive handler in the interrupt handler is managing completion of processing of receive data, a separate send interrupt handler may be managing completion of processing of send data. FIG. 5 is a flow chart (500) illustrating a process for completion of processing of send data by a send thread in the interrupt handler. Events in the send interrupt event queue are processed in the order in which they are received in the send event queue (502). Data associated with processing of the send event is placed in a send completion queue (504) for completion of processing by an interrupt handler. In one embodiment, placement of data in the completion queue includes a notification to a send interrupt handler responsible for completing processing of data associated with the send item placed in the queue (506). In the case of a send completion item placed in a send completion queue, a send interrupt handler is notified of placement of the item in the send completion queue. In one embodiment, a send polling thread is invoked when there is any data in the send completion queue that require processing, queues the work to a single send thread (508), and then releases the interrupt handler (510). In one embodiment, all of the items in the completion queue are pulled from the associated send completion queue by the send polling thread. However, the quantity of items pulls from the associated send completion queue may be restricted based upon the quantity of items in the queue at any one time, and threshold restrictions, such as memory restrictions. If the quantity of items in the queue exceeds such a threshold, some of the items in the queue may remain in the queue until the prior items pulled from the queue have completed processing. In one embodiment, the items pulled by the send polling thread to the handler are processed by a single send thread. For each item pulled from the send completion queue, the send thread finds the buffer pointer (514), validates the data packet (516), and releases the data packet (518). As demonstrated above, completion of a send event includes placement in a send completion queue and invokes a send interrupt handler. In the interrupt context, completion of a send interrupt handler includes queuing the data to a single send thread, which is separate from and operates independent of the receive thread. The current state of art has a single thread to process both send and receive events. As demonstrated above, send and receive events are separately queued and separate threads are provided to process send events independent of receive events.

As demonstrated above with respect to FIGS. 4 and 5, both the receive and send interrupt handlers may each have a restriction in memory pertaining to the quantity of items it may handle to complete a task. If the quantity of items in the respective queues exceeds the threshold, the respective completion queue monitoring thread continues to forward items to the interrupt handler as permitted. Furthermore, in the event the quantity of items in the queue does not exceed the respective handler threshold, the process outlined above is continuously repeated for each item placed in the completion queue.

Figure 6:
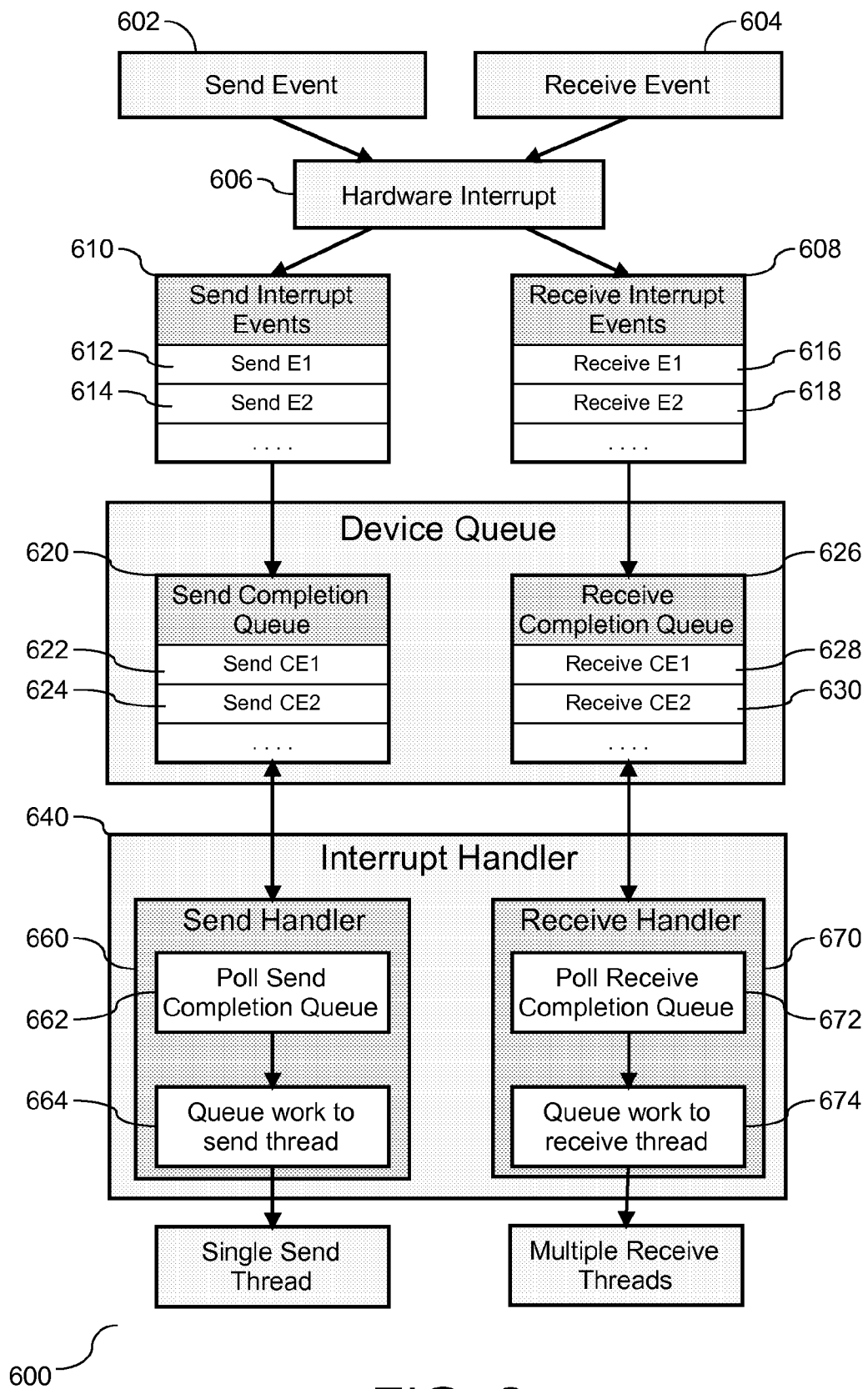
FIG. 6 is a block diagram illustrating device queues and completion queues in relation to an interrupt handler according to the preferred embodiment of this invention, and is suggested for printing on the first page of the issued patent.

FIG. 6 is a block diagram (600) illustrating device queues and completion queues in relation to an interrupt handler. The details of the operation of the completion queues are described above in detail in FIGS. 4 and 5. As shown, there are two forms of an originating event that may generate a hardware interrupt, a send event (602) and a receive event (604). Either of the events may generate a hardware interrupt (606), and the originating event is placed in one of two interrupt event queues (608) and (610). Based on the identifying information of the event, the event is placed in one of the two interrupt event queues (608) and (610). For example, in one embodiment, the event may include a bit which identifies whether the originating event is a send event or a receive event. One of the interrupt event queues (608) is for a receive event, and the other interrupt event queue (610) is for a send event. Accordingly, send events are placed in the send interrupt event queue (610) and receive events are placed in the receive interrupt event queue (608).

In the example shown in FIG. 6, there are four events in the interrupt event queues (608) and (610). Send event$_1$ (612) and send event$_2$ (614) are shown in the send interrupt event queue (610), and receive event$_1$ (616), and receive event$_2$ (618) are shown in the receive interrupt event queue (608). In one embodiment, each of the send and receive interrupt event queues may include more items or fewer items. The invention herein should not be limited to the quantity of items shown in the queues. As the events in each of the separate interrupt event queues (608) and (610) are processed, they are placed in separate completion queues for completion of processing of associated event data. For example, as shown in FIG. 6, a send completion queue (620) includes two items (622) and (624) that require processing of associated send event data, and a receive completion queue (626) includes two items (628) and (630) that require processing of associated receive event data.

The interrupt event queues (608) and (610) are different from the completion queues (620) and (626), as the interrupt event queues processes events and the completion queues process completion of event data. As shown in this example, the send completion queue (620) has two events that require completion. The events are shown in the order of receipt. Send completion event$_1$ (622) is completion of processing of data from send event$_1$ (612), and send completion event$_2$ (624) is completion of processing of data from send event$_2$ (614). Similarly, as shown the receive completion queue (626) has two events that require completion of receive event data. The events are shown in the order of receipt. Receive completion event$_1$ (628) is completion of processing of data from receive event$_1$ (616) and receive completion event$_2$ (630) is completion of processing of data from receive event$_2$ (618). In one embodiment, each of the send and receive completion queues may include fewer or greater number of listings depending upon the processing of tasks listed therein, and the invention should not be limited to the quantity of items in the queues shown as there are merely illustrative examples. The queues associated with processing events and data for completion of the events are separated based upon whether the originating events was a send event or a receive event. In one embodiment, the items listed in each of the queues are processed in a first in first out order.

Furthermore, as shown in FIG. 6, an interrupt handler (640) has a send handler (660) and a receive handler (670). The send handler (660) has a thread (662) that polls the send completion queue (620). Similarly, the receive handler (670) has a thread (672) that polls the receive completion queue (626). Each of the threads (662), (672) is invoked by an associated event to poll the associated completion queue (620), (626), respectively, for presence of data to be processed by the respective interrupt handler. The send handler (662) is invoked by presence of a data item in the send completion queue (620). Any work associated with the completion queue is queued within the send handler (660) to a single send thread (664). The single send thread (664) pulls the first listed element from the send completion queue (620) and processes the packet associated with the item to complete processing of the packet. Similarly, the receive handler (672) is invoked by presence of any item in the receive completion queue (626). Any work associated with the receive completion queue is queued within the receive handler (672) to a receiving thread (674) on the same CPU which received the interrupt. The receiving thread (674) pulls the first listed element from the completion queue (622) and processes the packet associated with the item. In one embodiment, the work is forwarded to one of multiple receiving threads for processing of the packets associated with the item from the receive completion queue.

Figure 7:
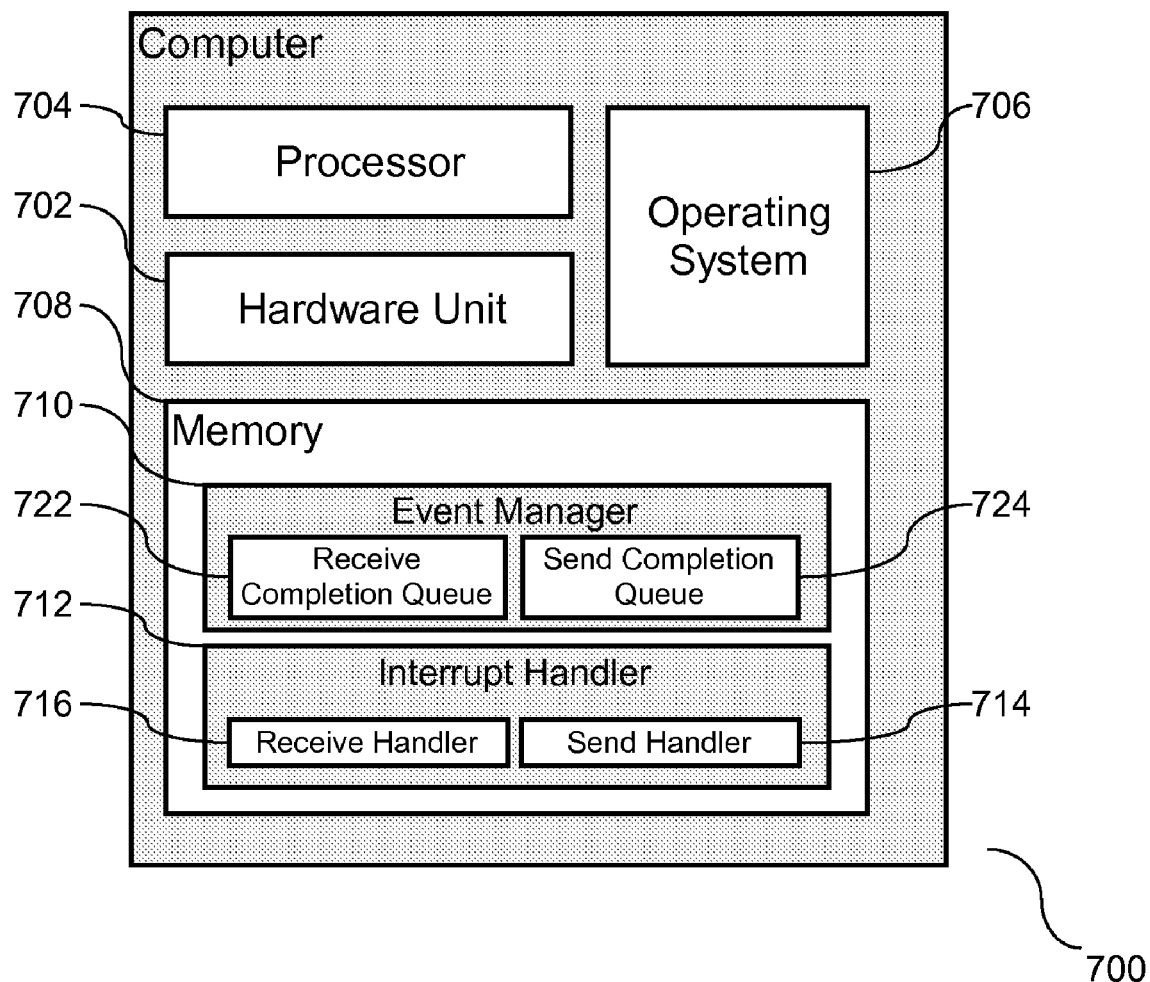
FIG. 7 is a block diagram illustrating placement of an event manager and an interrupt handler in a computer system.

FIG. 7 is a block diagram (700) illustrating a computer system with a hardware unit (702), a processor (704) in communication with an operating system (706), and memory (708). As shown, memory (708) includes an event manager (710) in communication with the operating system (706). In addition, memory (708) includes an interrupt handler (712) in communication with the event manager (710). The event manager is responsible for receipt of an event (not shown) from the processor (704), and generates a hardware interrupt with the operating system (706) in response to receipt of the event. In one embodiment, the event may be in the form of a signal. The hardware interrupt sends the event to one of at least two queues, a receive completion queue (722) and a send completion queue (724). Both the send and receive completion queues are a part of the event manager (710). Each of these queues is categorized based upon the characteristics of the event. The interrupt handler (712) completes processing of data associated with the event. The interrupt handler (712) has both a send handler (714) and a receive handler (716). The send handler (714) processes data associated with completion of a send transaction. Similarly, the receive handler (716) processes data associated with completion of a receive transaction. Both the event manager (710) and the interrupt handler (712) are shown residing in memory (708) of the computer (702). In one embodiment, the event manager (710) and the interrupt handler (712) may reside as hardware tools external to memory (708) and in the hardware unit (702). Accordingly, the managers (710) and (712) may be implemented as a software tool or a hardware tool to facilitate management of hardware interrupts in a computer system.

Embodiments within the scope of the present invention also include articles of manufacture comprising program storage means having encoded therein program code to facilitate processing of an interrupt. The program code may include event manager instructions responsible for receipt of an event from the processor (704), and event handler instructions to initiate program code of the interrupt handler to generate a hardware interrupt with the operating system (706) in response to receipt of the event. Similarly, the program code may include instructions responsible to complete processing of data associated with the event. Program code is provided in the event manager to process and separate a send event and a receive event. The event manager program code associated with a send event processes data associated with completion of a send transaction. Similarly, the event manager program code associated with a receive event processes data associated with completion of a receive transaction. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

The configuration of the interrupt handler with separate send and receive handler enables send and receive tasks to be processed simultaneously and separately when they share the same hardware interrupt. This helps reduce latency associated with processing data associated with both send and receive tasks. In addition, the provision of separate device queues and event queues enables the send and receive tasks to be separate and organized prior to forwarding to the respective interrupt handlers. Similarly, the separation of the queues enables tasks associated with receive events to be processed separately from tasks associated with send events. Accordingly, separation of the queues and interrupts handlers reduces latency with processing of send and receive events, and it also increases both unidirectional and bidirectional throughput bandwidth.

Alternative Embodiments

It will be appreciated that, although specific embodiments of the invention have been described herein for purposes of illustration, various modifications may be made without departing from the spirit and scope of the invention. In particular, the send and receive threads of the send and receive interrupt handlers, respectively, may run on different CPUs where the receive interrupt handler would be configured to complete processing of receive events, and the send interrupt handler would be configured to complete processing of send events. In one embodiment, the receive interrupt thread may be invoked on the same CPU in which the hardware interrupt is invoked, and the send interrupt thread may be scheduled for execution on a different CPU. Accordingly, the scope of protection of this invention is limited only by the following claims and their equivalents.

I claim:

1. A method for processing data, comprising:
   receiving an event from a processor that generates a hardware interrupt, wherein the received event is in the form of one of a receive event and a send event;
   limiting placement of the receive event in a receive queue, and limiting placement of the send event in a send queue;
   invoking an interrupt handler to complete processing of data associated with said event, said interrupt handler having a send handler to process send data in the send queue and associated with completion of a send transaction and a receive handler to process receive data in the receive queue and associated with completion of a receive transaction, wherein said interrupt handler supports simultaneous and separate processing of send process data and receive process data; and
   the receive and send handlers operating on different processors threads.

2. The method of claim 1, further comprising a send thread in communication with said send handler to process completion of send process data, and a receive thread in communication with said receive handler to process completion of receive process data, wherein said send thread is separate from said receive thread.

3. The method of claim 1, further comprising processing send transactions in said send queue in order of receipt in said send queue and processing receive transactions in said receive queue in order of receipt in said receive queue.

4. The method of claim 3, further comprising placing data from an executed transaction in one of said send and receive queues in a respective completion queue for processing of completion data.

5. The method of claim 4, wherein said respective completion queue includes a receive completion queue for processing receive completion data, and a send completion queue for processing send completion data.

6. The method of claim 5, further comprising polling said send completion queue with a send polling thread to determine presence of an item in said send completion queue and to pull said item to said send handler for processing, and polling said receive completion queue with a receive polling thread to determine presence of an item in said receive completion queue and to pull said item to said receive handler for processing, wherein said send polling thread is separate from said receive polling thread.

7. The method of claim 1, further comprising sending said event to a first event queue if said event is a receive event and sending said event to a second event queue if said event is a send event.

8. A computer system comprising:
   a processor operatively connected to an event manager;
   the processor to receive an event;
   the event manager to receive the event from said processor and to generate a hardware interrupt in response to receipt of said event, wherein each event is assigned to one of a receive event queue and a send event queue, wherein the receive event queue is limited to receipt of a receive event and the send event queue is limited to receipt of a send event; and
   an interrupt handler to complete processing of data associated with said event received from said event manager, said interrupt handler having a send handler to process send data in the send event queue associated with completion of a send transaction, and a receive handler to process receive data in the receive event queue associated with completion of a receive transaction, wherein said interrupt handler supports simultaneous and separate processing of send process data and receive process data; and
   the receive handler operating on a first processor thread and the send handler operating on a second processor thread.

9. The system of claim 8, further comprising the second processor thread in communication with said send handler to process completion of send process data, and the first processor thread in communication with said receive handler to process completion of receive process data, wherein said second processor thread is separate from said first processor thread.

10. The system of claim 8, wherein said send interrupt event queue serves for a send transaction and said receive interrupt event queue serves for a receive transaction, wherein said send interrupt event queue is separate from said receive interrupt event queue.

11. The system of claim 10, further comprising a send process manager to process a send transaction in said send event queue in order of receipt in said queue and a receive process manager to process a receive transaction in said receive event queue in order of receipt in said queue.

12. The system of claim 11, further comprising a transaction manager to place data from an executed transaction in a respective completion queue for processing of completion data.

13. The system of claim 12, further comprising a send poll thread in said send handler to determine presence of an item in said send completion queue and to pull said item to said send handler to be processed, and a receive poll thread in said receive handler to determine presence of an item in said receive completion queue to pull said item to said receive handler to be processed.

14. The system of claim 8, further comprising said hardware interrupt to send said event to one of at least two queues, wherein each of said at least two queues are categorized based upon a characteristic of said event.

15. An article comprising:
a tangible computer readable carrier including computer program instructions configured to cause a computer to process data comprising:
instructions to receive an event from a processor that generates a hardware interrupt, wherein a receive event is assigned to a receive event queue and a send event is assigned to a send event queue separate from said receive event queue; and
instructions to invoke an interrupt handler to complete processing of data associated with said event, said interrupt handler having a send handler to process send data in the send event queue associated with completion of a send transaction and a receive handler to process receive data in the receive event queue associated with completion of a receive transaction, wherein said interrupt handler supports simultaneous and separate processing of send process data and receive process data; and
the receive handler operating on a first processor thread and the send handler operating on a second processor thread.

16. The article of claim 15, further comprising instructions for a send thread in communication with said send handler to process completion of send process data, and instructions for a receive thread in communication with said receive handler to process completion of receive process data, wherein said send thread is separate from said receive thread.

17. The article of claim 15, further comprising instruction for processing send transactions in said send event queue in order of receipt in said queue and instructions for processing receive transactions in said receive event queue in order of receipt in said queue.

18. The article of claim 17, further comprising instructions to place data from an executed transaction in one of said event queues in a respective completion queue for processing of completion data.

19. The article of claim 18, wherein said respective completion queue includes a receive completion queue for processing receive completion data, and a send completion queue for processing send completion data.

20. The article of claim 19, further comprising instructions to poll said send completion queue with a send polling thread to determine presence of an item in said send completion queue and to pull said item to said send handler for processing, and instructions to poll said receive completion queue with a receive polling thread to determine presence of an item in said receive completion queue and to pull said item to said receive handler for processing, wherein said send polling thread is separate from said receive polling thread.

* * * * *